April 28, 1942. J. R. THORP 2,281,467
BRAKE LEVER
Filed Dec. 26, 1939 2 Sheets-Sheet 1
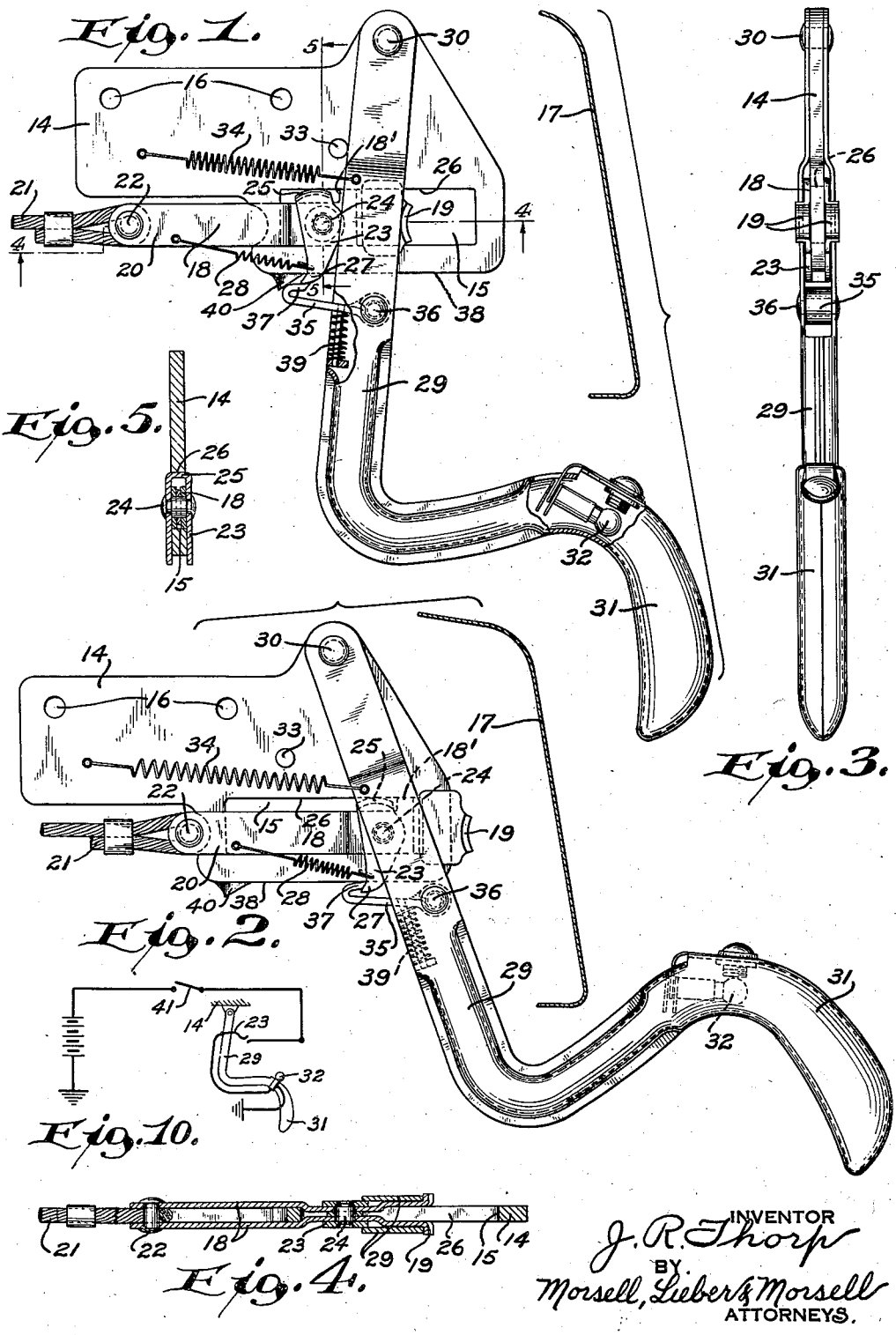

April 28, 1942. J. R. THORP 2,281,467
BRAKE LEVER
Filed Dec. 26, 1939 2 Sheets-Sheet 2
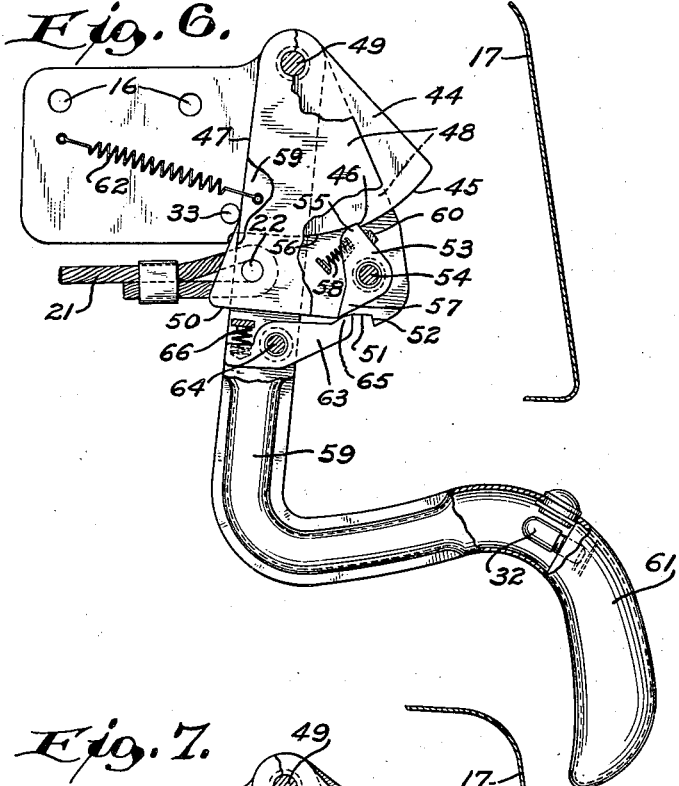
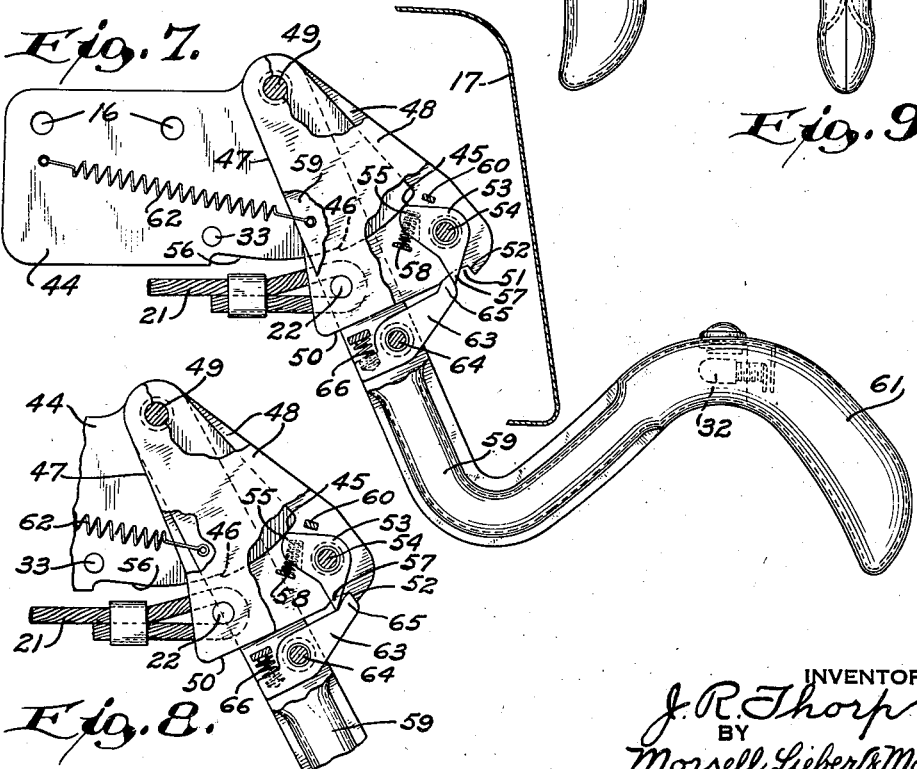
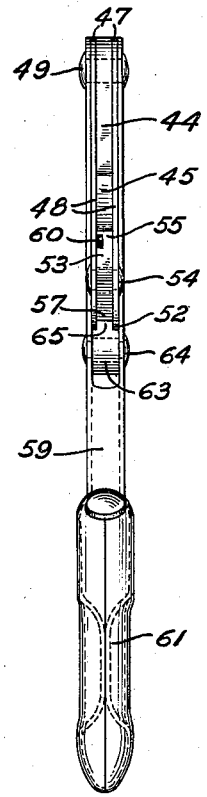
INVENTOR
J. R. Thorp
BY
Morsell, Lieber & Morsell
ATTORNEYS Patented Apr. 28, 1942

2,281,467

UNITED STATES PATENT OFFICE 2,281,467

BRAKE LEVER

Joel R. Thorp, West Allis, Wis., assignor to The Fulton Company, West Allis, Wis., a corporation of Wisconsin Application December 26, 1939, Serial No. 310,887

8 Claims. (Cl. 74—531)

The present invention relates generally to improvements in manually operable lever controlled mechanisms, and relates more specifically to improvements in the construction and operation of manipulating lever assemblages for automobile emergency brakes or the like.

Generally defined, an object of my invention is to provide a simple and highly efficient lever assemblage, which is especially adapted for the manipulation of automobile brakes or the like.

Most of the present automobile emergency brake operating levers are difficult to manipulate, primarily because they are located at relatively dark and inaccessible places beneath the instrument panels, and also because they are provided with auxiliary release buttons or latch levers associated with the main lever handles, these auxiliary devices being provided for the purpose of effecting release of the brakes after each setting thereof. The brake operator therefore must not only reach far forward and beneath obstacles such as an instrument panel, but must also manipulate a tightly jammed release lever, latch or button before the brakes can be released. In order to obviate this excessive reach, it has heretofore been proposed to provide various types of brake lever extensions, but these attachments are relatively undesirable and unsatisfactory because they frequently become loose and rattle, and they also introduce obstructions which make it difficult to enter and leave the driver's seat. Then too, it frequently happens that an operator runs his car with the brakes set, thus quickly ruining the brake shoes or bands, and no satisfactory means have heretofore been provided for indicating when this condition prevails. The prior brake lever assemblages are therefore far from being satisfactory, in many respects.

It is a more specific object of the present invention to provide a more efficient brake lever assemblage wherein the brake handle is always accessible for manipulation of the brake, and in which the brake handle is devoid of push buttons and latch levers and causes least obstruction at all times.

Another specific object of the present invention is to provide an improved brake manipulating lever which has no release latch or button associated with the operating handle thereof, and which therefore affords a firm grip and is easily manipulatable.

Still another specific object of the present invention is to provide a new and useful brake actuating assemblage which can be manufactured and sold at moderate cost, and which can be applied to most standard automobiles.

Still another additional specific object of the present invention is to provide an improved brake actuating lever provided with tell tale means which will indicate that the brake is set when the car is placed in motion.

A further specific object of the present invention is to provide a new and useful electric system whereby a tell tale light associated directly with a lever, will indicate when the lever is improperly set, as when the brakes are set and the vehicle is being propelled by the engine.

Another specific object of the present invention is to provide an improved brake lever assemblage which can be applied as a unit in replacement of other similar assemblages on many different types of vehicles.

These and other specific objects and advantages will be apparent from the following detailed description.

A clear conception of the several features constituting the present invention, and of the mode of constructing and of manipulating several types of brake lever assemblages built in accordance with the improvement, may be had by referring to the drawings accompanying and forming a part of this specification wherein like reference characters designate the same or similar parts in the various views.

Fig. 1 is a part sectional side elevation of one type of improved brake lever assemblage having a reciprocable setting slide, and showing the mechanism in brake release position;

Fig. 2 is a similar view of the same assemblage, showing the mechanism in brake set position, and the lever handle in the act of releasing the brake;

Fig. 3 is an end or front view of the assemblage of Fig. 1, with the instrument panel removed;

Fig. 4 is a transverse horizontal section through the assemblage of Fig. 1, taken along the line 4—4;

Fig. 5 is a transverse vertical section through the assemblage of Fig. 1, taken along the line 5—5;

Fig. 6 is a part sectional side view of another type of improved brake lever assemblage having an oscillatory setting element, and showing the mechanism in brake release position;

Fig. 7 is a similar view of the assemblage of Fig. 6, showing the mechanism in brake set position, and the lever handle in the act of releasing the brake;

Fig. 8 is another similar view of a fragment of the assemblage of Figs. 6 and 7, showing the mechanism in brake set position, and the handle in extreme forward position directly after the brake has been set;

Fig. 9 is an end or front view of the assemblage of Fig. 6, with the instrument panel removed; and Fig. 10 is a diagram of the electrical system for illuminating the tell tale light on the brake handle.

While the invention has been shown and described herein as being embodied in emergency brake actuating levers especially applicable to motor driven vehicles wherein the brakes tend to return to released position at all times, it is not the desire or intent to unnecessarily restrict the scope or utility of the improvement by virtue of such specific embodiment.

Referring specifically to Figs. 1 to 5 inclusive, the improved brake lever assemblage shown therein comprises in general, a supporting plate or flat bracket 14 having a rectilinear slot 15 therein and also having bolt holes 16 for effecting attachment of the bracket to an automobile or the like forwardly of the usual instrument panel 17; a slide 18 having a rear head 18' reciprocable within the slot 15 and being provided at its extreme rear end with lateral curved projections 19 while the opposite or front end has bifurcations 20, the extreme front portions of which are secured to a brake actuating cable 21 by means of a pin 22; a retaining latch 23 swingably suspended from the medial portion of the slide 18 by means of a pivot 24 and having its upper end provided with a curved cam surface portion 25 which is cooperable with the upper surface 26 of the slot 15, while its lower end is provided with an actuating projection 27 and is engaged by a spring 28 which constantly tends to swing the latch 23 toward locking position; a brake lever 29 having its upper end bifurcated to straddle the bracket 14 and slide 18 and pivotally suspended from the bracket by means of a pivot pin 30, while its lower end is provided with a rearwardly off-set handle 31 disposed beneath the panel 17 and having a tell tale light 32 associated therewith, the upper bifurcated portion of the lever 29 being constantly urged forwardly toward a stop pin 33 on the bracket 14 by means of a relatively strong spring 34; and a pawl 35 swingably suspended from the medial portion of the lever 29 by a pin 36 and having a latch engaging hook portion 37 which is constantly urged toward the lower surface 38 of the bracket 14 by means of a compression spring 39.

The main bracket 14 may be formed of a single relatively heavy piece of sheet metal, while the latch 23 and pawl 35 may each be formed of a single piece of lighter sheet metal, and the slide 18 and lever 29 may each be made of two similar pieces of sheet metal welded, riveted or otherwise firmly secured together. All of these parts may therefore be produced from standard sheet metal stock with the aid of punches and dies; and the surface 26 of the rectangular slot 15, as well as the surface 38 of the bracket 14 should be dressed or finished so as to permit the cam portion 25 to effectively grip the former, and to also permit the hook portion 37 to ride freely along the latter. The portion of the slide 18 located forwardly of the head 18' is of reduced height, so as not to interfere with the cam portion 25 of the retaining latch 23, which cam portion extends laterally through the slot 15 as shown in Fig. 5; and the cable 21 which connects with the brakes, should constantly exert a forward pull on the slide 18. If this is not the case, suitable adjusting means should be provided between these parts. The slide 18 is adapted to be moved rearwardly within the slot 15 by means of the lever 29 and its engagement with the lateral projections 19 as in Fig. 1; but when this engagement is interrupted as in Fig. 2, the spring 28 acting upon the latch 23 quickly causes the cam portion 25 to jam against the slot surface 26, thereby locking the slide 18 and cable 21 against forward movement. The hook portion 37 of the pawl 35 is normally urged into engagement with the lower bracket surface 38 and rides therealong, but may be lifted away from this surface 38 by the latch projection 27 and by a fixed lug 40 formed on the bottom of the bracket 14, as in Fig. 1. The handle 31 of the lever 29 is adapted to lie approximately in the plane of the rear surface of the instrument panel 17 when the lever 29 is swung forward as far as possible as shown in Fig. 1, and the brake lever 29 may be thus positioned either when the brakes are released or when they are set. The tell tale lamp 32 which is confined in the lever 29 near the handle 31, is placed in circuit with the ignition or starting switch 41 of the vehicle propelling motor, as shown in Fig. 10; and this circuit is adapted to be interrupted by the locking latch 23 when the brakes are released, and completed by this latch when the brakes are set and the motor is operating.

When the brake lever assemblage of Figs. 1 to 5 inclusive has been properly constructed and assembled, it may be installed as a unit on most standard automobiles in proximity to the instrument panel 17, as illustrated in Figs. 1 and 2; and the cable 21 is taut at all times and is constantly exerting a pull forwardly on the lever 29 and tends to urge this lever against the stop pin 33 as shown in Fig. 1. When the assemblage is positioned as shown in Fig. 1, the brakes are released and the lamp 32 will not be illuminated even if the ignition switch 41 is closed. In order to set the brakes, it is only necessary to grasp the handle 31 and to pull rearwardly on the lever 29, thereby causing the lever to engage the slide projections 19 and to pull the slide 18 and the latch 23 rearwardly within the bracket slot 15. Upon release of the handle 31, the lever 29 will be swung forwardly by the tension spring 34, but the slide 18 will be locked against return movement by the cam portion 25 on the latch 23 which jams against the slot surface 26 thereby maintaining the brakes set in spite of the fact that the lever 29 has been returned to engagement with the stop pin 33. In order to subsequently release the brakes, it is only necessary to again grasp the handle 31 and to swing the lever 29 rearwardly until the hook portion 37 of the pawl 35 engages the projection 27 of the latch 23 as in Fig. 2. As the rearward motion of the lever 29 and pawl 35 continues, the cam portion 25 will be released from the surface 26, and the lever 29 may then be permitted to swing forwardly until the brakes are fully released and the lever engages the stop pin 33. The assemblage may thus be returned to brake release position as in Fig. 1, ready for subsequent setting of the brakes; and if the brakes are not released when the ignition switch 41 is closed, the tell tale light 32 will be illuminated and will remain thus until the switch is opened or the brakes are released.

Referring specifically to Figs. 6 to 9 inclusive, the modified brake lever assemblage shown therein comprises in general a supporting plate bracket 44 having an arcuate lower surface 45 and an abutment 46 at one end of this surface, the bracket 44 being provided with attaching holes 16; an oscillatory slide element 47 comprising two similar approximately triangular plates 48 swingably suspended from a pivot pin 49 carried by the bracket 44, and having lower alined surfaces 50, notches 51 at the corresponding ends of the surfaces 50, and projections 52 forming abutments near the notches 51; a retaining latch 53 swingably suspended from the slide plates 48 by means of a pivot 54 and having one end provided with a cam surface portion 55 which is cooperable with the arcuate bracket surface 45, while its opposite end is provided with a projection 57 adapted to extend downwardly beyond the surfaces 50, the latch being constantly urged toward locking position by a spring 58; a brake lever 59 having its upper end swingably suspended from the pin 59 and bifurcated to straddle the slide element 47, while its lower portion is provided with a rearwardly extending off-set having a simple gripping handle 61 formed integral therewith and normally disposed approximately in the plane of the rear face of the instrument panel 17; a relatively strong tension spring 62 normally urging the lever 59 forwardly against a stop pin 33 carried by the bracket 44; and a pawl 63 swingably suspended from the lever 59 by means of a pin 64 and having a latch engaging nose portion 65 which is constantly urged toward the surface 50 by a spring 66.

The bracket 44, latch 53 and pawl 63 may each be formed of a single relatively heavy piece of sheet metal while the slide element 47 and lever 59 may each be formed of two similar sheet metal parts rigidly attached to each other in any suitable manner, and all of these parts may be readily formed with the aid of punches and dies. The forward portion of the bracket 44 adjacent the abutment 46 is provided with a cut-out 56, and the latch 53 is cooperable with a stop 60 formed on one of the side plates 48 when the latch engages the abutment 46, see Fig. 6. The arcuate surface 45 of the bracket 44 should be formed so that it may be effectively gripped by the cam portion 55 of the latch 53 when the parts are positioned as in Figs. 7 and 8; and when the latch 53 is positioned against the abutment 46 and in the recess or cut-out 56 as in Fig. 6, the pawl 63 is adapted to ride over the lower end 57 of the latch 53. The brake connecting cable 21 is secured to the side plates 48 of the oscillatory element 47 by means of a pin 22, and constantly tends to swing the element 47 against the stop pin 33; and as previously indicated, the lever 59 is also constantly urged toward the pin 33 by the spring 62. The slide element 47 and the cable 21 are adapted to be swung rearwardly about the pivot pin 49 when the lever 59 is swung rearwardly as shown in Fig. 8, and the pawl 63 is adapted to ride over the latch projection 57 when the lever 59 is released, thereby permitting the latch 53 to remain in locking position while the lever swings back to normal under the influence of the spring 62. The handle 61 of the modified lever 59 is likewise adapted to normally lie approximately in the plane of the instrument panel 17 as in Fig. 6, and the lever 59 is also preferably provided with a telltale light 32 as previously described.

When the brake lever assemblage of Figs. 6 to 9, inclusive, has been properly formed and assembled, it may also be installed as a unit on most standard automobiles in proximity to the instrument panel 17 as illustrated in Figs. 6 and 7; and the cable 21 will normally be taut and exert a pull forwardly on the slide element 47 tending to urge this element against the stop pin 33 as in Fig. 6. When the assemblage is thus positioned, the brakes are released and the lamp 32 will not be illuminated even if the motor ignition switch 41 is closed. In order to set the brakes, it is only necessary to grasp the handle 61 and to pull the lever 59 rearwardly to the position shown in Fig. 8, thereby causing the pawl 63 to engage the abutment 52 of the element 47 and simultaneously causing the cam portion 55 of the latch 53 to ride along the arcuate surface 45. Upon release of the handle 61, the lever 59 will be swung forwardly by the spring 62 and returned to the position shown in Fig. 6, but the brake will remain set by virtue of the fact that the cam surface 55 of the latch 53 firmly grips the surface 45 of the frame 44 and thereby prevents the element 47 from swinging forwardly. In order to subsequently release the brakes, it is only necessary to again swing the lever 59 rearwardly, whereupon the pawl 63 will engage the projection 57 of the latch 53 as indicated in Fig. 7. Continued pull on the handle 61 will release the latch 53, whereupon the pull on the cable 21 will gradually return the element 47 to the position shown in Fig. 6. The assemblage will thus be returned to brake release position ready for subsequent setting of the brakes, and if the brakes are not released when the ignition switch 41 is closed, the signal light 32 will be illuminated and will remain in such condition until the switch is opened or the brakes are released.

From the foregoing detailed description it will be apparent that my present invention provides an extremely simple, compact, durable and highly efficient brake lever assemblage which may be installed as a unit in most standard automobiles. The handle of the brake lever is at all times conveniently accessible for setting or release of the brakes, and may be disposed beneath the instrument panel to avoid undesirable obstruction, either when the brakes are set or when the brakes are released. The tell tale light 32 gives a visible indication whenever the brakes are set and the propelling motor is operated, and this feature is of extreme importance in order to protect the brake bands against damage. The improved brake lever assemblage can be manipulated without necessity of pressing buttons or latch levers associated with the brake lever handle, and when the brakes are set, the cam portion of the latch will effectively retain the same in set condition until they are subsequently manually released. In some cases it may not be desirable to have the brake lever returnable to starting position when the brake is set, and the latch pivot pin 24 of Fig. 1 may then be extended to project into the path of swing of the lever 29, or a separate stop pin may be provided on the slide 18 or slide element 47 in front of the hand lever. The cam portions 25, 55 may also be replaced by any other type of equivalent structure, such as a wedge, or a wedge and roller, and this cam portion may also be made renewable when worn. The assemblage can obviously be formed with the aid of punches and dies at minimum cost, and can be readily installed by a novice.

It should be understood that it is not desired to limit this invention to the exact details of construction or to the precise mode of use, herein shown and described, for various modifications within the scope of the claims may occur to persons skilled in the art.

I claim:

1. A brake lever assemblage for automobiles, comprising, a bracket having an elongated surface, a slide element movable along and in proximity to said surface and having a tension connection with the brakes, a latch means carried by said element and being engageable with said surface to retain the brakes set, a lever swingably suspended from said bracket and having a pawl remote from the lever actuating handle, said lever being cooperable with said slide element to move the same in one direction and said pawl being engageable with said latch means to release the same, and means for normally maintaining said lever in brake release position independently of the brakes.

2. A brake lever assemblage for automobiles, comprising, a bracket having an elongated surface, a slide element movable along and in proximity to said surface and being connected to brakes which constantly urge said element in a forward direction, latch means carried by said element and having a locking portion engageable with said surface to lock the brakes in set condition, a lever swingably suspended from said bracket and being cooperable with said slide element to move the same in a rearward direction, a pawl carried by said lever and being cooperable with said latch means to release the same when said lever is moved rearwardly, and means for normally maintaining said lever in brake release position independently of the brakes.

3. A brake lever assemblage for automobiles, comprising, a member having a guiding surface, an element movable along said member in proximity to said surface and having cam means for locking said element at various positions along the surface, said element being connected to the brakes and being constantly urged in a forward direction by the brake tension, a lever movably suspended from said member and having pawl means engageable with said cam means to release the same when said lever is moved rearwardly, said lever being cooperable with said element to move the same in a rearward direction, and means constantly tending to return said lever to brake release position independently of the brakes.

4. A brake lever assemblage for automobiles, comprising, a member having a guiding surface, an element movable along said member in proximity to said surface and having cam means for locking said element at various positions along the surface, said element being connected to the brakes and being constantly urged in one direction by the brake tension, a lever movably suspended from said member and having pawl means engageable with said cam means to release the same, said lever being cooperable with said element to move the same in the opposite direction, and means constantly tending to return said lever toward brake release position independently of the brakes.

5. A brake lever assemblage for automobiles, comprising, a bracket disposable forwardly of and concealed by the instrument panel, a slide element carried by said bracket and being connected to the brakes, means for locking said slide element in various positions of adjustment, a lever for actuating said slide element and said locking means, said lever having a rearwardly off-set handle normally disposed approximately in the plane of the instrument panel and devoid of movable parts for actuation of said slide, and means constantly tending to return said lever toward brake release position independently of the brake.

6. An automobile brake lever assemblage, comprising, a bracket having a slot therein, a clamping element movable along said slot and having a tension connection with the brakes, a lever movably suspended from said bracket and having a pawl engageable with said element to release the clamping action thereof within said slot, said lever and pawl being co-operable with said element to set the brakes, and means constantly tending to return said lever toward brake release position independently of the brakes.

7. An automobile brake lever assemblage, comprising, a bracket having a rectilinear slot therein, an element movable along and having cam means for locking the element at various positions within said slot, said element being connected to the brakes and being constantly urged along said slot in one direction by brake tension, a lever swingably suspended from said bracket and having thereon a pawl which is co-operable with said cam means to release said element, said lever also being co-operable with said element to move the same along said slot in the opposite direction, and means for returning said lever to brake release position independently of the brakes.

8. An automobile brake lever assemblage, comprising, a bracket having a rectilinear slot therein, an element movable along and having cam means for locking the element at various positions within said slot, said element being connected to the brakes and being constantly urged along said slot in one direction by brake tension, a lever swingably suspended from said bracket and having thereon a pawl which is co-operable with said cam means to release said element, said lever being co-operable with said element through said pawl and said cam means to move the element along said slot in the opposite direction, and resilient means for returning said lever to brake release position independently of the brakes.

JOEL R. THORP.